United States Patent [19]
Fukuda

[11] Patent Number: 5,306,680
[45] Date of Patent: Apr. 26, 1994

[54] FINE FLAKY BOEHMITE PARTICLES AND PROCESS FOR THE PREPARATION OF THE SAME

[75] Inventor: Takeshi Fukuda, Kurobe, Japan

[73] Assignee: Yoshida Kogyo K.K., Tokyo, Japan

[21] Appl. No.: 27,331

[22] Filed: Mar. 5, 1993

[30] Foreign Application Priority Data

Mar. 30, 1992 [JP] Japan .................................. 4-74504

[51] Int. Cl.$^5$ .............................................. C01F 7/02
[52] U.S. Cl. ................................... 501/153; 501/127; 423/629; 423/625
[58] Field of Search ............... 423/629, 625; 501/153, 501/127

[56] References Cited

U.S. PATENT DOCUMENTS

| | | | |
|---|---|---|---|
| 4,716,029 | 12/1987 | Oguri et al. | 423/625 |
| 4,946,666 | 8/1980 | Brown | 501/127 |
| 5,019,367 | 5/1991 | Oguri et al. | 501/152 |

*Primary Examiner*—Mark L. Bell
*Assistant Examiner*—C. Bonner
*Attorney, Agent, or Firm*—Flynn, Thiel, Boutell & Tanis

[57] ABSTRACT

Fine flaky boehmite particles which have an orthorhombic crystal form and a specified crystal face grown in the form of a flat plate, and a process for the preparation of fine flaky boehmite particles which comprises subjecting aluminum hydroxide or hydrated alumina having a particle size adjusted to the order of submicron to hydrothermal treatment in water or an aqueous alkali solution at a temperature of 150° C. or above and under a pressure of 100 atm or below. The fine flaky boehmite particles are useful as a starting material for the preparation of fine flaky alumina particles or as a filler suitable for a pigment for coating materials, a filler for rubbers and plastics and a coating material for paper making.

2 Claims, 3 Drawing Sheets

0.5 μm

F I G. 5
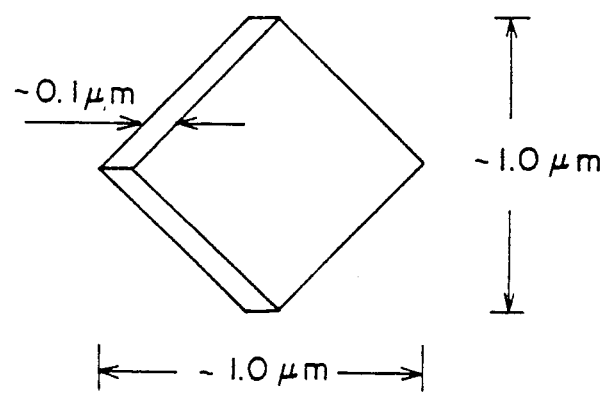

FINE FLAKY BOEHMITE PARTICLES AND PROCESS FOR THE PREPARATION OF THE SAME

BACKGROUND OF THE INVENTION

1. Field of the Invention

The present invention relates to fine flaky boehmite particles which are useful as the starting material for the preparation of fine flaky alumina particles or as a filler suitable for a pigment for coating materials, a filler for rubbers and plastics and a coating material for paper making, and a process for efficiently preparing the boehmite particles by hydrothermal treatment.

2. Description of the Prior Art

Up to this time, various fine boehmite particles and various processes for the preparation thereof have been known and examples of such processes include one which comprises conducting pyrolysis of aluminum hydroxide as a starting material in the atmosphere to remove part of the water of crystallization, thereby forming a boehmite phase, and one which comprises conducting hydrothermal treatment of aluminum hydroxide in a hermetically sealed vessel to form a boehmite phase.

Although the boehmite particles prepared by the above processes can be finely ground mechanically by the use of, e.g., a ball mill, into fine particles having a size of the order of submicron, these processes are problematic in that the obtained particles tend to become globular and fine flaky particles are difficult to obtain.

Of the above processes for preparing fine boehmite particles, the pyrolysis process has another problem in that when the aluminum hydroxide to be used as the starting material is contaminated with fine particles, no boehmite phase is formed, but chialumina ($\chi$-$Al_2O_3$), which is a transitional alumina, is formed to lower the yield of boehmite particles. On the other hand, the hydrothermal treatment process has another problem in that the formed boehmite particles are in the form of a tight aggregate of rhombic prisms and cannot form fine flaky particles, even when they are finely ground.

SUMMARY OF THE INVENTION

Under these circumstances, the present invention aims at providing fine flaky boehmite particles which can be converted into fine flaky alumina particles and are useful as a filler for various materials, and a process for preparing the boehmite particles efficiently.

The first invention according to the present invention relates to fine flaky boehmite particles which have an orthorhombic crystal form and a specified crystal face grown in the form of a flat plate. The major and minor axes of the particles are preferably both 5 $\mu$m or less, more preferably the order of submicron (less than 1.0 $\mu$m). The ratio of the major axis to the minor axis is preferably between 1 and 5, more preferably between 1 and 1.5. Further, the aspect ratio (i.e., ratio of minor axis to thickness) is between 3 and 100.

The second invention according to the present invention relates to a process for the preparation of fine flaky boehmite particles which comprises subjecting aluminum hydroxide or hydrated alumina having a particle size adjusted to the order of submicron to hydrothermal treatment in water or an aqueous alkali solution at a temperature of 150° C. or above and under a pressure of 100 atm or below.

BRIEF DESCRIPTION OF THE DRAWINGS

FIG. 5 is an enlarged view of particles constituting the powder prepared in the Example.

DETAILED DESCRIPTION OF THE PREFERRED EMBODIMENTS

Figure 1:
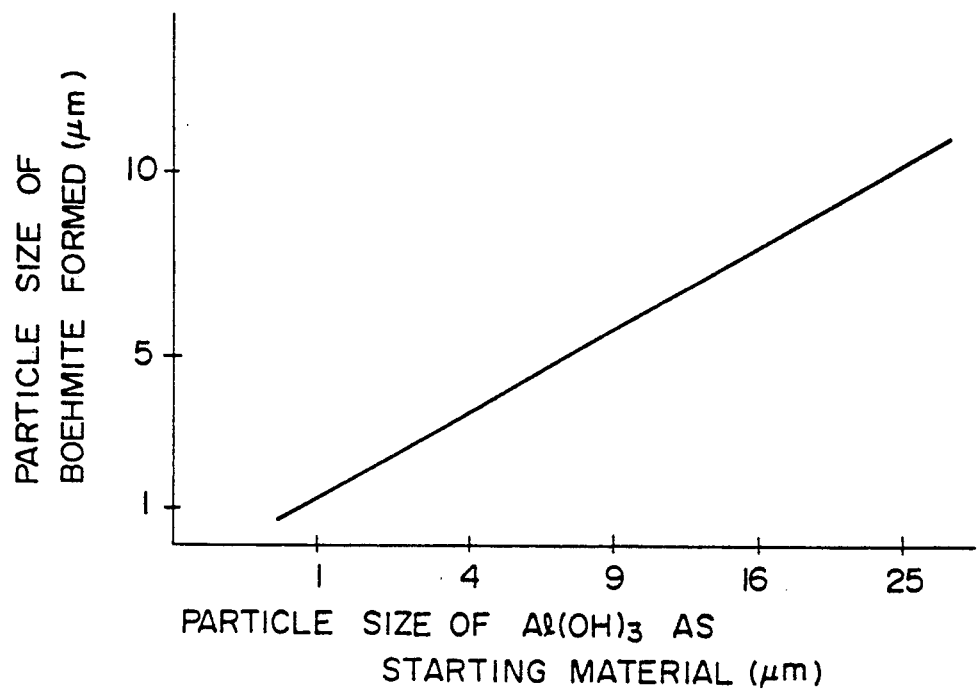
FIG. 1 is a graph showing the relationship between the particle size of a starting material and that of boehmite particles formed therefrom.

In the process of the present invention, aluminum hydroxide or a hydrated alumina such as alumina hydrate or alumina gel, the particle size of which has been adjusted to the order of submicron by grinding in a ball mill or the like, is used as the starting material, and the starting material is filled in a hermetically sealed autoclave together with water or an aqueous alkali solution such as an aqueous solution of caustic soda or sodium carbonate to conduct hydrothermal treatment. The adjustment of the particle size of the aluminum hydroxide or hydrated alumina (i.e., alumina gel which is a partially amorphous hydrated alumina) to the order of submicron is necessary for forming boehmite particles having a size of the order of submicron finally and contributes greatly to making the boehmite particles flaky. The temperature and pressure must be controlled during the hydrothermal treatment so as to fall within such a region of the phase diagram of $Al_2O_3$-$H_2O$ that a boehmite phase can be present stably. The temperature must be adjusted to 150° C. or above during the hydrothermal treatment, because no boehmite can be formed at a temperature below 150° C. Although the upper limit of the temperature is not particularly set, a boehmite phase is converted into an $\alpha$-alumina phase when treated at a temperature of as high as 350° C. or above over a long period of time, so that it is unfavorable in respect of the formation of a boehmite phase to conduct the hydrothermal treatment at too high a temperature. Further, when it is necessary to prepare only fine flaky boehmite particles, process control is difficult. Accordingly, it is preferable that the temperature of the hydrothermal treatment be 150° C. or above but below 350° C. Within such a temperature range, a higher temperature gives a higher rate of formation of a boehmite phase to give fine particles in a short time, while a lower temperature gives a lower rate of formation thereof and necessitates prolonged treatment to result in coarser particles, though the particles obtained in any case have a flaky shape. Further, the hydrothermal treatment must be conducted under a pressure of 100 atm or below, because the particles prepared under a pressure exceeding 100 atm are thick and coarse. The hydrothermal treatment under a high pressure exceeding several hundred atmospheres gives rise to not a boehmite phase but a diaspore phase. The lower limit of the pressure is preferably 10 atm, because no hydrothermal system is stable in the open system.

According to the process of the present invention, fine boehmite particles whose crystal form is orthorhombic and in which a specified crystal face grows in the form of a flat plate can be prepared. The thus obtained boehmite particles preferably have a major axis of 5 μm or less and a minor axis of 5 μm or less (both more preferably of the order of submicron), a ratio of the major axis to the minor axis of from 1 to 5 (more preferably from 1 to 1.5), a thickness of less than 0.1 μm and an aspect ratio (ratio of the minor axis to the thickness) of from 3 to 100. The boehmite particles prepared according to the present invention are useful as a (raw) material for preparing fine flaky alumina particles, a pigment for coating materials, a filler for rubbers and plastics, a coating material for paper making and so forth.

The present invention will now be described more specifically by referring to the following Examples.

EXAMPLE 1

A predetermined amount of pure water was added to 10 g of aluminum hydroxide obtained by the Bayer Process and having a particle size adjusted to a predetermined median diameter in a ball mill to form a slurry. This slurry was filled in a small-sized autoclave and subjected to hydrothermal treatment at 300° C. under a pressure of 65 kg/cm$^2$. The obtained product was washed with water, filtered and dried to give boehmite particles. The relationship between the mean particle size (the average of the major axis and minor axis; the same shall apply hereinunder) of the product (boehmite particles) and that of the starting material (aluminum hydroxide particles) was determined by the use of the boehmite particles prepared by the above process. Each mean particle size was determined by measurement of particle size distribution and observation under a scanning electron microscope. The results are given in FIG. 1.

It can be understood from FIG. 1 that the boehmite particles prepared by hydrothermal treatment tend to become more coarse with an increase in the particle size of the starting material (aluminum hydroxide).

Boehmite particles were prepared in the same manner as that described above except that aluminum hydroxide having a mean particle size adjusted to 0.7 μm was used and that the hydrothermal treatment was conducted at predetermined temperatures. The other conditions were the same as those employed above. The relationship of the mean particle size of product (boehmite particles) and the temperature of hydrothermal treatment was determined by the use of the boehmite particles thus prepared. The results are given in FIG. 2.

Figure 2:
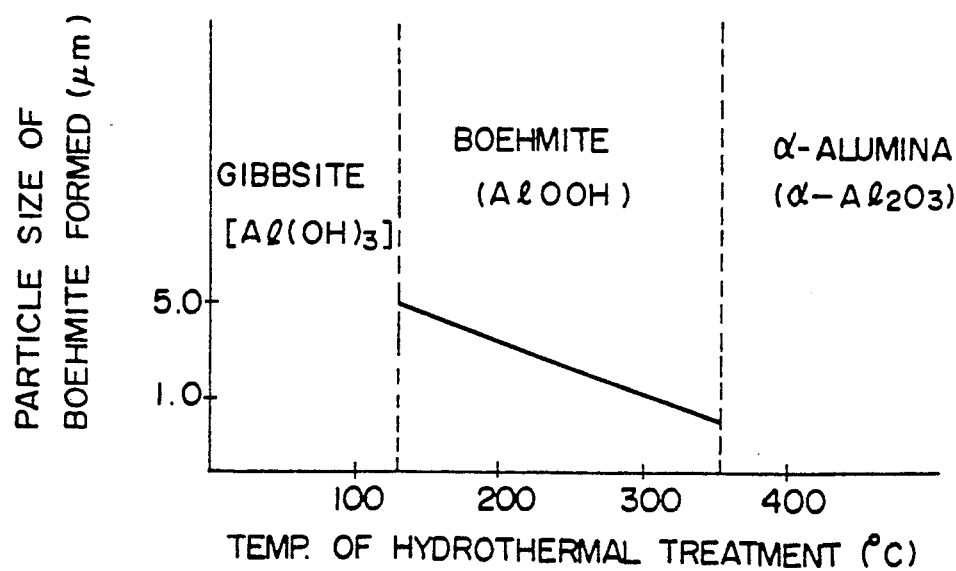
FIG. 2 is a graph showing the relationship between the mean particle size of boehmite particles formed and the temperature of hydrothermal treatment.

It can be understood from FIG. 2 that the mean particle size of boehmite particles tends to become smaller with a rise in the temperature of hydrothermal treatment. Such a tendency was observed with respect to the thickness of the particles. Further, it can be understood that when the hydrothermal treatment is conducted at a temperature lower than 150° C., gibbsite is formed, while when it is conducted at 350° C. or above, α-alumina is formed. Furthermore, the relationship between the mean particle size of boehmite particles and the pressure of hydrothermal treatment was determined with the temperature of hydrothermal treatment being kept at 300° C. The results are given in FIG. 3.

Figure 3:
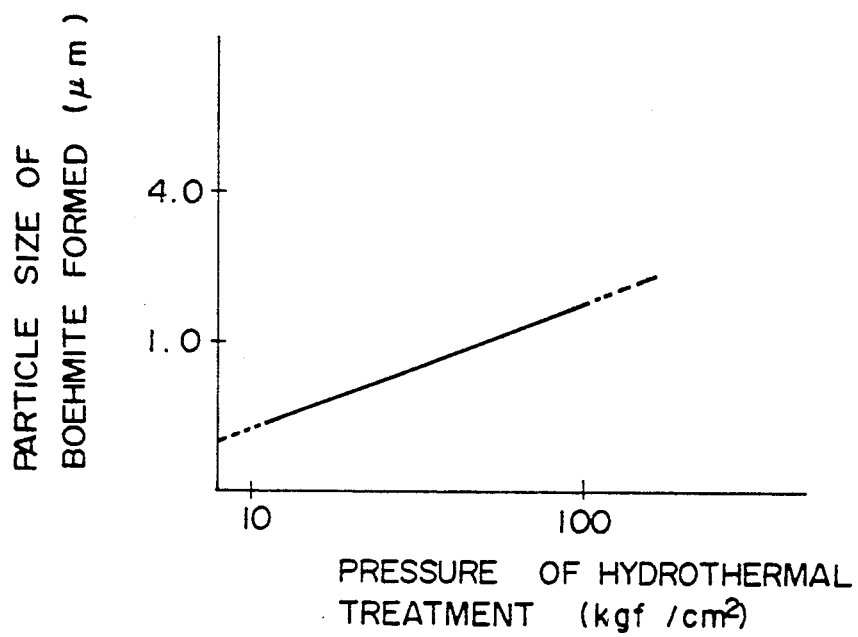
FIG. 3 is a graph showing the relationship between the mean particle size of boehmite particles formed and the pressure of hydrothermal treatment.

It can be understood from FIG. 3 that the mean particle size of boehmite particles prepared by hydrothermal treatment (hydrothermal synthesis) tends to become smaller with a decrease in the pressure of hydrothermal treatment and tends to become larger with an increase in the pressure thereof, within a pressure range of from 10 to 100 atm. Such a tendency was also observed with respect to the thickness of the particles.

It can be understood from the results described above that the requirements that the particle size of the raw material must be adjusted to the order of submicron and that the hydrothermal treatment of the resulting raw material must be conducted at a temperature of 150° C. or above but below 350° C. and under a pressure of 10 to 100 atm are necessary for preparing fine flaky boehmite particles. The boehmite particles obtained under such processing conditions were uniformly fine particles having major and minor axes both of the order of submicron (less than 1.0 μm), a major axis: minor axis ratio of from 1 to 5, a thickness of less than 0.1 μm and an aspect ratio (ratio of the minor axis to the thickness) of from 3 to 100. Further, it was found that the particles had an orthorhombic system and a specific crystal face grown in the form of a flat plate.

The present invention is not limited by the conditions employed in the Example 1.

EXAMPLE 2

Figure 4:
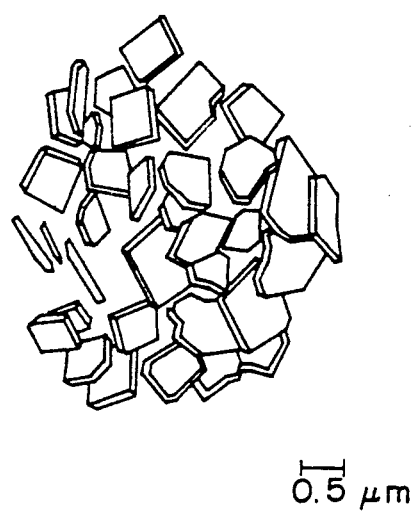
FIG. 4 is an illustration of the powder prepared in the Example.

A predetermined amount of pure water was added to 10 g of aluminum hydroxide obtained by the Bayer process and having a mean particle size adjusted to 0.7 μm in a ball mill to form a slurry. This slurry was filled in a small-sized autoclave and subjected to hydrothermal treatment at 300° C. under a pressure of 65 kg/cm$^2$. The obtained product was washed with water, filtered and dried to give a boehmite powder. This powder is shown in FIG. 4. An enlarged detail of particles constituting the powder is shown in FIG. 5. It can be understood from FIGS. 4 and 5 that the boehmite powder according to the present invention is composed of uniform particles having a major axis and minor axis both of the order of submicron (less than 1.0 μm), a thickness of about a little under 0.1 μm and an orthorhombic crystal system in which a specified crystal face grows in the form of a flat plate. Further, it was also found that the particles constituting the above powder had a ratio of the major axis to the minor axis of from 1 to 5 and an aspect ratio (ratio of the minor axis to the thickness) of from 3 to 100.

The obtained boehmite particles were heated in an electric oven at 1300° C. for 3 hours. The obtained alumina powder was composed of uniformly fine flaky particles of α-Al$_2$O$_3$ having a particle size of about a little under 1.0 μm and a thickness of about a little under 0.1 μm and retaining the shape of the boehmite particles.

As described above, the fine flaky boehmite particles of the present invention can be converted into fine flaky alumina particles through pyrolysis which is the easiest industrial means, thus being useful.

EXAMPLE 3

Fine flaky boehmite particles were prepared in a similar manner to that of Example 2 and added to a coating material as a pigment. The obtained mixture was applied onto a flat plate to form a coating film. This coating film was ascertained to consist of boehmite particles which were oriented in the state of several parallel layers in the film. BY virtue of the presence of the boehmite pigment in such a multilayered state, even when the surface layer of the coating film deteriorates, the coating film under the surface layer can be protected against deterioration. Further, penetration of fluid into the coating film and permeation of gas though the film can be hindered to improve the resistance of the film to moisture and water. Accordingly, the coating film is excellent in weathering resistance and endurance.

EXAMPLE 4

Fine flaky boehmite particles were prepared in a similar manner to that of the Example 2 and added to a rubber and a plastic to examine characteristics of the particles as a filler.

It has been confirmed that the fine flaky boehmite particles of the present invention have excellent reinforcing properties and, hence are effective in improving the tensile strength, tear strength and tensile stress of rubbers and plastics, are homogeneously dispersible in rubbers and plastics (polymers) and are excellent in orientation. Further, the boehmite particles of the present invention are fine and flaky, so that they have excellent fluidity in polymers, mechanical and electrical properties and surface finish properties.

When a polymer filled with the boehmite particles according to the present invention is molded, the particles are oriented in a certain direction by the molding. Thus, the molding operation affects the orientation and dispersion of the boehmite particles to advantageously. Particularly, means for causing plastic flow, such as stretching and rolling, are effective.

As described above, the fine flaky boehmite particles of the present invention are useful for the preparation of fine flaky alumina particles and are useful as a pigment for coating materials, a filler for rubbers and plastics, a coating material for paper making and so forth.

According to the process of the present invention, fine flaky boehmite particles which exhibit excellent effects in various fields can be prepared at high efficiency and uniformity.

What is claimed is:

1. A process for the preparation of a fine flaky boehmite particle having an orthorhombic crystal form, a crystal face grown in the form of a flat plate, major and minor axes of the order of submicron and a ratio of the major axis to the minor axis between 1 and 5, said process comprising the step of subjecting aluminum hydroxide or hydrated alumina having a particle size of the order of submicron to hydrothermal treatment in essentially pure water or a solution consisting essentially of an aqueous caustic soda solution or an aqueous sodium carbonate solution at a temperature from 150° to 350° C. and a pressure between 10 to 100 atm.

2. A process according to claim 1, wherein said hydrothermal treatment is conducted in essentially pure water.

* * * * *